United States Patent
Ozaki et al.

(10) Patent No.: US 9,260,278 B2
(45) Date of Patent: Feb. 16, 2016

(54) REMOTE HANDLING APPARATUS FOR LOAD OBJECT AND AUXILIARY APPARATUS THEREOF

(71) Applicant: FUJI ELECTRIC CO., LTD., Kawasaki (JP)

(72) Inventors: Hiroshi Ozaki, Machida (JP); Hirokazu Kitanishi, Yokohama (JP); Akira Takagi, Setagaya (JP); Hisaaki Hiue, Yokohama (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 14/536,833

(22) Filed: Nov. 10, 2014

(65) Prior Publication Data

US 2015/0100151 A1 Apr. 9, 2015

Related U.S. Application Data

(63) Continuation of application No. PCT/JP2013/005344, filed on Sep. 10, 2013.

(51) Int. Cl.
| | |
|---|---|
| *G06F 7/00* | (2006.01) |
| *B66D 1/40* | (2006.01) |
| *G06F 3/01* | (2006.01) |
| *B66C 13/16* | (2006.01) |
| *B66C 13/18* | (2006.01) |

(52) U.S. Cl.
CPC . *B66D 1/40* (2013.01); *B66C 13/16* (2013.01); *B66C 13/18* (2013.01); *G06F 3/016* (2013.01)

(58) Field of Classification Search
None
See application file for complete search history.

(56) References Cited

U.S. PATENT DOCUMENTS

| | | | |
|---|---|---|---|
| 6,411,276 B1 * | 6/2002 | Braun | G05G 9/047 345/156 |
| 2007/0112458 A1 | 5/2007 | Kondo et al. | |
| 2008/0275596 A1 * | 11/2008 | Tarasinski | G05G 9/047 701/1 |

FOREIGN PATENT DOCUMENTS

| | | |
|---|---|---|
| JP | 2-218566 | 8/1990 |
| JP | 4-299714 | 10/1992 |
| JP | 4-310381 | 11/1992 |

(Continued)

OTHER PUBLICATIONS

Fuji Electric Journal, 2012, vol. 85, No. 1, 5 pp.
International Search Report mailed Dec. 17, 2013, in corresponding International Patent Application No. PCT/JP2013/005344.

*Primary Examiner* — Yolanda Cumbess (57) ABSTRACT

A remote handling apparatus includes a joystick device, a load lifting device and a counterforce controller. The joystick device includes a counterforce generator that generates operation counterforce via a stick that accepts manual operation. The counterforce controller includes a pulsed counterforce controller and/or a deviation counterforce controller. The pulsed counterforce controller calculates a time rate of change of a dynamic load value of the load object, and outputs a counterforce command signal indicating a counterforce command value for generating pulsed counterforce. The deviation counterforce controller calculates a deviation amount of a dynamic load value from a static load value, and outputs a counterforce command signal indicating a counterforce command value for generating a counterforce. Embodiments may be implemented as an auxiliary apparatus, which is attached to an existing remote handling apparatus.

20 Claims, 4 Drawing Sheets

(56) References Cited

FOREIGN PATENT DOCUMENTS

| JP | 5-324076 | 12/1993 |
| JP | 2003-107188 | 4/2003 |
| JP | 2005-14132 | 1/2005 |
| JP | 2005-169561 | 6/2005 |
| JP | 2006-977 | 1/2006 |
| JP | 2009-28893 | 2/2009 |
| JP | 2009-208170 | 9/2009 |

* cited by examiner

REMOTE HANDLING APPARATUS FOR LOAD OBJECT AND AUXILIARY APPARATUS THEREOF

CROSS-REFERENCE TO RELATED APPLICATIONS

This application is a continuation application, filed under 35 U.S.C. §111(a), of International Application PCT/JP2013/005344 filed on Sep. 10, 2013, the disclosure of which is incorporated herein by reference.

BACKGROUND

1. Field

The present disclosure relates to a remote handling apparatus for a load object, and an auxiliary apparatus thereof. More particularly the present disclosure relates to a remote handling apparatus for a load object that is operated by a joystick, and an auxiliary apparatus thereof.

2. Description of Related Art

A handling apparatus used by an operator to remotely control a target object at nuclear power generation facilities or the like has been turned into practical use. Japanese Patent Application Laid-open No. 2003-107188 (e.g. FIG. 12, FIG. 13) discloses a refueling machine at a nuclear power generation facility. Normally such a refueling machine includes an apparatus to control the lifting of an operation object by manual operation. In the present application, a handling apparatus for an operation object that an operator remotely operates is called "remote handling apparatus", and the operation object is called "load object".

Operation input devices of a remote handling apparatus that an operator directly touches are roughly classified into: a switch input device which accepts the lifting operation by a switch, such as a button, and a joystick device that accepts operation by a lever or stick. Actually in a conventional nuclear power generation facility, an operator manually operates an operation input device to lift a load object, relying on an image of the load object captured by camera and an indicated-value of the load sensor which measures the constantly changing load value of the load object.

Figure 1:
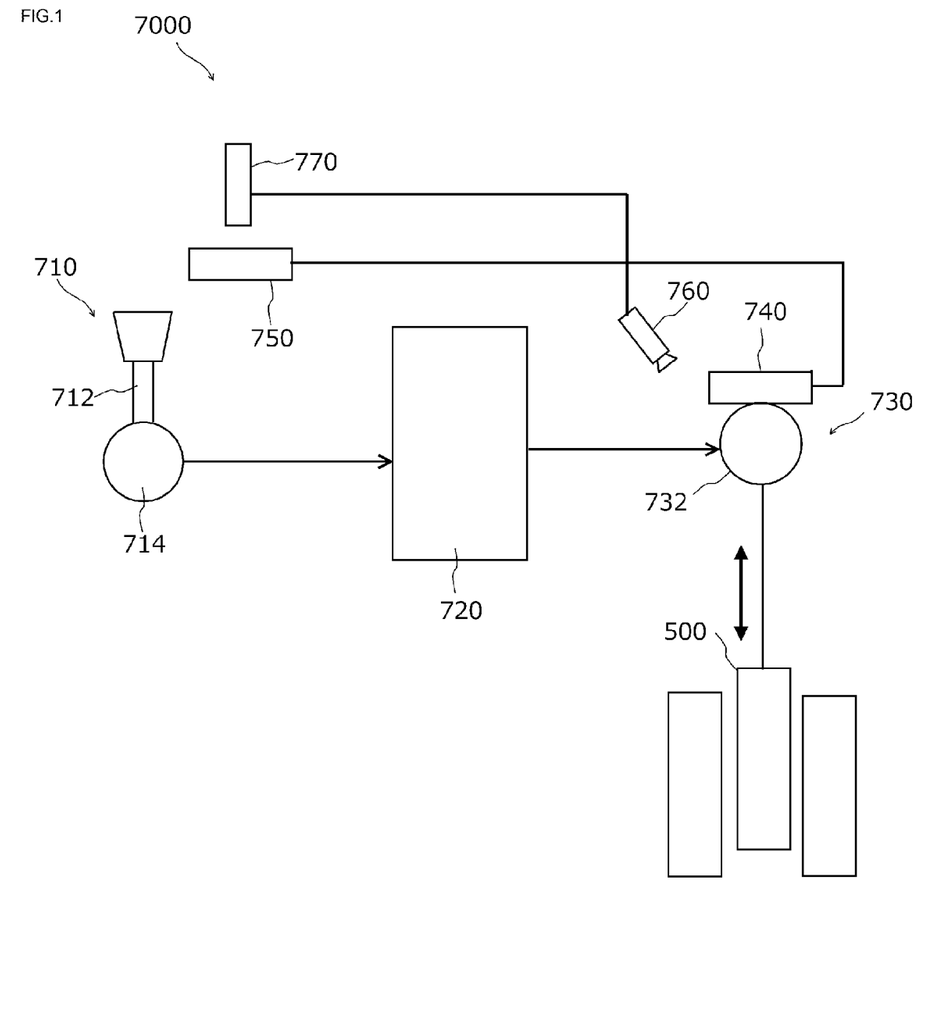
FIG. 1 is a schematic block diagram depicting a configuration of a conventional remote handling apparatus.

FIG. 1 is a schematic block diagram depicting the configuration of a conventional remote handling apparatus 7000 that uses a joystick device 710. The joystick device 710 has a stick 712 used for manual operation by an operator, and the stick 712 includes a potentiometer 714 which is a position sensor for detecting input position coordinate values based on the inclination of the stick controlled by the operator. For example, in the joystick device 710, the neutral position is the intermediate position of one input axis of the stick 712. From this neutral position as the center, one direction corresponds to ascending and the other direction corresponds to descending, and this neutral position corresponds to stopping. A controller 720 converts the input position coordinate value of the potentiometer 714 into a command signal for a motor 732 of a lifting device 730 according to this correspondence. The operation of the motor 732 is converted into operations for ascending, stopping or descending of a load object 500 via an appropriate multiplication/reduction mechanism, such as gears. The inclination of the input axis of the stick 712 of the joystick device 710, that is, the position of the input coordinate, corresponds to the velocity of ascending, stopping or descending the load object 500. A load sensor 740 for measuring the dynamic load value of the load object 500 is attached to the lifting device 730, and the value indicated by the load sensor 740 is presented on a display device 750 to the operator who is operating the joystick device 710. Images of the load object 500 and the peripheral area thereof photographed by the camera 760 are also presented to the operator on a display device 770, which is positioned at eye level directly in front of the operator.

In Fuji Electric Journal Vol. 85, Issue 1, January 2013, it is reported that a load signal, generated depending on the state of contact with a peripheral object, can be recognized as a counterforce in the joystick, so that the operator recognizes the handling state as a tactile sense.

SUMMARY

Additional aspects and/or advantages will be set forth in part in the description which follows and, in part, will be apparent from the description, or may be learned by practice of the invention.

The inventors of the present application analyzed the actual operations of an operator who operates a remote handling apparatus that uses a joystick device as the input device. It was observed that the conventional remote handling apparatus 7000 must be improved in terms of the load on the operator. When a load object 500 vertically suspended is ascended/descended, for example, images of the load object 500 and the peripheral area thereof are displayed on the display device 770 via the camera 760, which is located near the lifting device 730 and faces the load object 500, which is positioned below. The measured value of the load sensor 740, and the display which changes according to the indicated value (e.g. graph, bar) are normally provided to the operator via another display device 750, a meter or the like. Relying on these images and the load values provided as visual information, the operator must observe and estimate the constantly changing state of the load object 500 at a distance, and operate the lifting device accordingly.

The actual camera 760, however, cannot always accurately photograph a critical position around the load object 500. For example, a dead angle, which makes photographing impossible, is often generated due to an obstacle. Further, even if a value of the load sensor 740 is abnormal and the indicated values of the display device 750 and meter change, the operator must constantly pay voluntary attention to these indicated values to notice the changes. As long as the state around the load object 500 and the load value are provided to the operator as visual information, an excessive load is imposed on the operator.

To decrease this operation load, the inventors of the present application examined a method for allowing the operator to recognize the contact state of the lifting device for lifting a load object with a peripheral object via tactile sense or force sense, using the operation counterforce of the joystick (hereafter simply called "counterforce"). Bilateral control was examined first. When bilateral control is used, a counterforce is fed back to the operator who is performing the operation in a master-slave system where a slave unit (lifting device) is manually controlled by operation of a master unit (e.g. joystick device). Here signals are transferred from the slave side to the master side via a signal path, where the counterforce signal is transferred from the slave unit (lifting device) to the master unit (joystick device). Typically, for example, a force in proportion to the load value of the object is transferred to the operator as the counterforce.

However as a result of examining bilateral control, the inventors of the present application discovered that even if the conventional bilateral control is applied to the lifting device used in a nuclear power generation facility, for example, the actual load imposed on the operator is not sufficiently decreased. This problem occurs not only in performing bilateral control of the lifting device in the ascending/descending direction, but also occurs in performing bilateral control in the horizontal direction perpendicular to the ascending/descending direction, and occurs in performing bilateral control having multiple degrees of freedom that reproduces counterforce, including a degree of freedom that involves torsion.

An aspect of the present invention is to solve at least some of the above mentioned problems. One aspect of embodiments of the present invention is to decrease the operation load in the remote handling apparatus by allowing the operator to recognize an appropriate counterforce based on appropriate information in the remote handling apparatus for a load object, and to contribute to advancing performance of the remote handling apparatus itself.

The inventors of the present invention noticed that the effect of bilateral control is limited due to the characteristics of the object, more specifically, the load object for the remote handling apparatus of a nuclear power generation facility, and due to the operation. In other words, a characteristic of the load object handled in a nuclear power generation facility is that a load object requires extremely careful and sensitive handling since fuel assembly or the like may be included. Moreover, the load object must be lifted in a position where other objects exist near the load object. This means that an operator must recognize with certainty the possibility of a slight impact (hitting) when the load object contacts a peripheral object, and a slight friction (rubbing) when the load object is ascended or descended in a state of contacting a peripheral object. On the other hand, a characteristic of operation of the remote handling apparatus in a nuclear power generation facility is that heightened attention of the operator is a necessity. The operator must operate while responding to constantly changing information, in addition to the above mentioned hitting and rubbing (hereafter called "contact information") of the load object.

The effect of the counterforce generated by the bilateral control is limited due to the characteristics of the load object and the characteristics of operation. In other words, the sensitive nature of the contact information between the load object and a peripheral object that must be paid attention to in a nuclear power generation facility does not change even if bilateral control is introduced, and the operator still is demanded to be very attentive so as not to miss recognizing a slight counterforce. This situation continues to remain even if the counterforce that is accurately proportionate to the load value can be generated in all degrees of freedom. To decrease the load imposed on the operator of the remote handling apparatus in a nuclear power generation facility, the effects of bilateral control alone are insufficient.

With the foregoing in view, the inventors of the present application paid attention to two issues: classifying the contact information of the load object by signal processing; and allowing the operator to recognize the contact information with high certainty by expressing the contact information as an enhanced counterforce or as a warning counterforce. Then the inventors created configurations of a remote handling apparatus that can decrease the load imposed on the operator, and an auxiliary apparatus of the remote handling apparatus, and confirmed the usefulness by an evaluative system, whereby the embodiments of the invention were completed.

A remote handling apparatus for a load object that is provided according to an aspect of the present application has: a joystick device in which a counterforce generator, which generates a counterforce to allow an operator to recognize the same via a stick for accepting manual operation according to a counterforce command value indicated by a received-counterforce command signal, is connected to the stick; a load lifting device that is installed away from the joystick device and that allows a load object to ascend, stop or descend according to either an input coordinate value of the stick or a velocity command value corresponding to the input coordinate value; and a pulsed counterforce controller that calculates a time rate of change of a dynamic load value of the object and that outputs a counterforce command signal, which indicates a counterforce command value for generating a pulsed counterforce according to the presence of the time rate of change, to the counterforce generator.

A remote handling apparatus for a load object that is provided according to an aspect of the present application, has: a deviation counterforce controller that calculates a deviation amount which indicates a difference of a dynamic load value from a static load value of the object, and outputs a counterforce command signal which indicates a counterforce command value according to the presence of the deviation amount, instead of the pulsed counterforce controller, or in addition to the pulsed counterforce controller.

In this application, the joystick device, for example, refers to an input device for inputting manual operation, which includes a moving element having a lever or a control stick (hereafter called "stick"), and which an operator operates by direct touching. Normally at least one angle of the stick is an input axis, and the coordinate value of the input axis is transferred as an electric signal.

The load lifting device includes any apparatus that can lift a load object by appropriately converting power from a power generator (e.g. electric motor) via gears or an appropriate power mechanism (e.g. hydraulics), and can allow the load object to ascend, stop or descend at a controlled velocity. In the present application, in order to control the velocity of ascending, stopping or descending of the load object, a velocity command value is referred to, which directly or indirectly reflects the input coordinate value of the joystick device.

The dynamic load value is time dependent, and is the same as the static load value if the load object remains still. The load value that changes along with time reflects a force that generates acceleration when the load object is accelerated/decelerated, and the fluctuation amount of the load value due to hitting (impact) or rubbing (friction) with a peripheral object, which the contact information pivots on. For example, the dynamic load value of the object is the same as the static load value if the load object and the peripheral objects both remain still. When the load object that is ascending at a constant velocity (uniform velocity) contacts a peripheral object which is remaining still, the force component generated by the impact is detected as a waveform where the load value is increases from the static load value at least at this moment. When the load object that is ascending at a uniform velocity slightly rubs against a peripheral object which is remaining still, the component of the friction force is detected as a waveform where the load value continuously increases from the static load value. In the case of the load object descending, a waveform the opposite of this is detected. The dynamic load value in the present application focuses on the component in the gravity direction. The terms hitting (impact) and rubbing (friction) are merely describing typical phenomena that could occur in the ascending/descending operation of a load object. Each aspect of the present invention can be applied regardless of how arbitrary phenomena, detected based on signal processing or data processing, is expressed.

In concrete terms, the time rate of change is a time differential value. In this application, the time rate of change is intended for the dynamic load value. In particular, a deviation amount, which is a difference of the dynamic load value from the static load value, may be determined first, so that the time rate of change is calculated as the time rate of change of the deviation amount.

The presence of the time rate of change or the deviation amount refers to the state where these values are not zero. A typical example is when it is determined that each value or the absolute value of each value is a significant value in comparison with an appropriate threshold.

In embodiments of the present invention, some aspects of the present application may be carried out with a more detailed configuration, or as an auxiliary apparatus that is added to an existing remote handling apparatus.

In any of the aspects of the present invention, a remote handling apparatus that can decrease the load imposed on the operator, or an auxiliary apparatus thereof, can be provided.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Embodiments of a remote handling apparatus according to the present invention and an auxiliary apparatus thereof will be described with reference to the drawings. Unless otherwise specified, same portions or elements are denoted with a same reference symbol in all the drawings. Each composing element of each embodiment is not always illustrated with the actual scale ratio.

1. Embodiment 1

1-1 General Configuration of Remote Handling Apparatus

Figure 2:
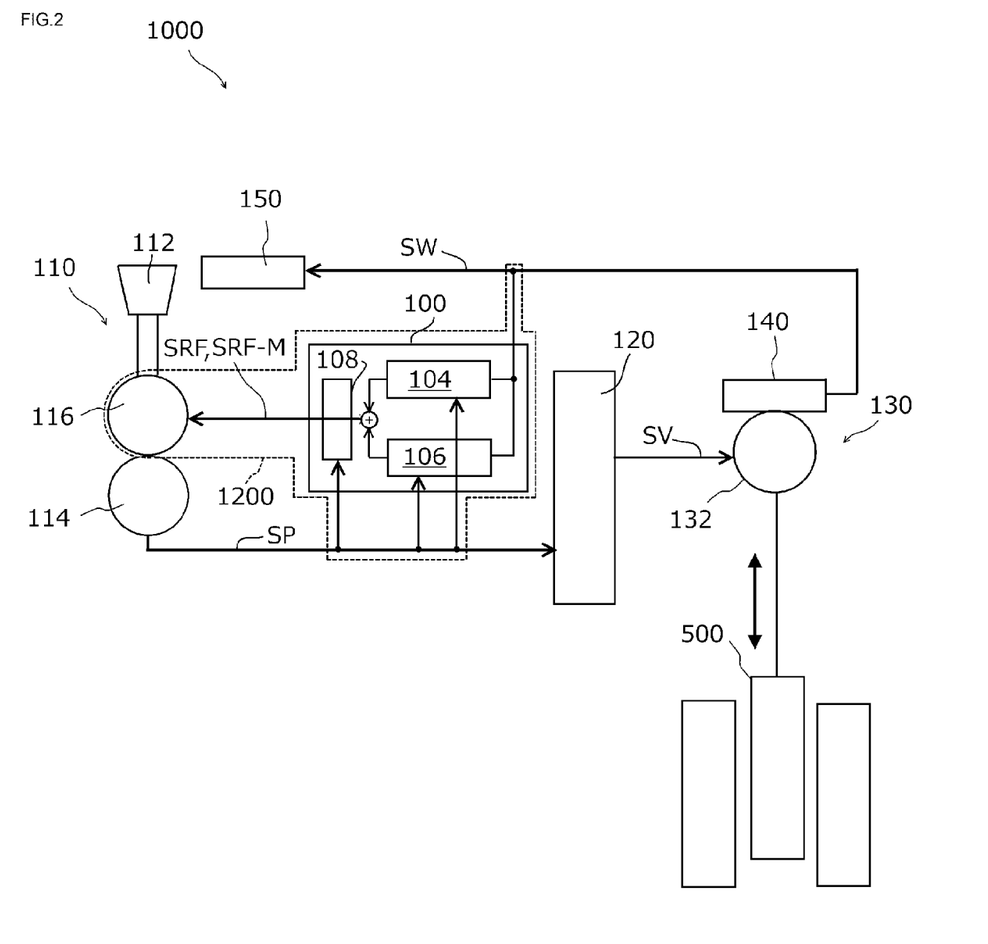
FIG. 2 is a schematic block diagram depicting a configuration of a remote handling apparatus according to an embodiment of the present invention.

FIG. 2 is a schematic block diagram depicting a configuration of a remote handling apparatus 1000 according to this embodiment. FIGS. 3A-3F show diagrams exemplifying the change of the load value and the counterforce that is generated thereby in the remote handling apparatus 1000. The remote handling apparatus 1000 of this embodiment includes a joystick device 110, a lifting controller 120, a load lifting device 130 and a load sensor 140.

The joystick device 110 includes an input coordinate sensor 114 and a counterforce generator 116. The input coordinate sensor 114 detects a coordinate value of one input axis via a stick 112 for accepting manual operation from an operator. The counterforce generator 116 generates a counterforce which the operator recognizes via the stick 112, according to a counterforce command value indicated by a received-counterforce command signal SRF or corrected counterforce command signal SRF-M, and is connected to the stick. A typical joystick device 110 includes such a mechanism as a spring (not illustrated) to apply force in a direction to return the stick 112 to the neutral position, so that the stick 112 immediately returns to the neutral position when the operator releases their hand from the stick 112. Even if the joystick has a plurality of input axes when viewed from the operator side, such as a front-back input axis and a left-right input axis, one input axis thereof is normally corresponded to the lifting of the load object 500.

The lifting controller 120 receives an input coordinate signal SP, which indicates an input coordinate value, from the input coordinate sensor 114, and outputs a velocity command signal SV, which indicates a velocity command value corresponding to the input coordinate value. The lifting controller 120 is installed as software for operating a programmable apparatus, such as a PLC (programmable logic controller) and a computer, which allows the input/output of signals.

The load lifting device 130 is installed away from the joystick device 110. The load lifting device 130 receives the velocity command signal SV, and allows the load object 500 to ascend, stop or descend according to the velocity command value, using the power of the load motor 132, for example. The velocity command value is a velocity value on the axis for lifting, or a value that can be converted into this velocity value.

The load sensor 140 is installed such that the dynamic load of the load object 500 can be detected. The load sensor 140 has sufficient responsiveness to measure the constantly changing load value.

1-2 Counterforce Controller 100 (Overview)

The remote handling apparatus 1000 further includes a counterforce controller 100. The counterforce controller 100 receives a load signal SW as an input, which indicates the dynamic load value, and outputs a counterforce command signal SRF which is inputted to the counterforce generator 116. The load signal SW here is displayed on a display device 150 as a signal which indicates a dynamic load value. As an input, the counterforce controller 100 uses at least either the input coordinate signal SP from the input coordinate sensor 114 or the velocity command signal SV from the lifting controller 120. Either of the input coordinate signal SP or the velocity command signal SV is used for controlling the direction of the counterforce. The remote handling apparatus 1000 also includes a unit that visually confirms the load object 500 using an imaging/display device similar to the one used in a camera 760 and a display device 770 (not illustrated in FIG. 2). The remote handling apparatus 1000 of this embodiment generates different counterforces according to the two types of contact status of the load object 500 based on the load signal SW.

[1-2-1 Contact Detection and Enhancement by Counterforce Controller]

The counterforce controller 100 of this embodiment detects hitting (impact) and rubbing (friction) of the load object 500 focusing on the signal waveform of the load signal SW. The invertors of the present application confirmed that hitting can be detected by the time rate of change of the load signal SW, and rubbing can be detected by the deviation amount, which is a difference of the load signal SW from the static load value.

Figure 3A:
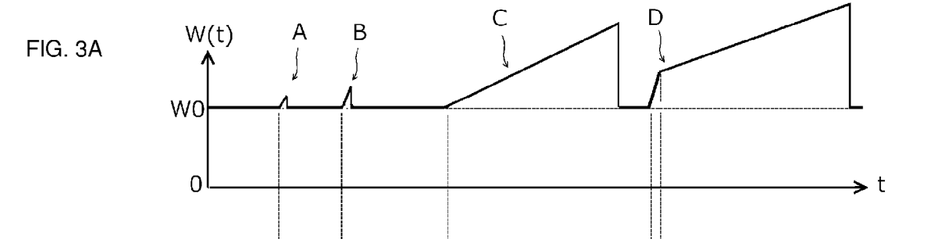
FIGS. 3A through 3F are diagrams exemplifying the change of load value and the counterforce that is generated thereby in the remote handling apparatus.
Figure 3B:
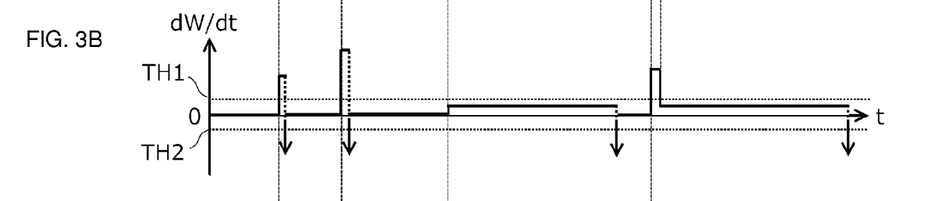
Figure 3C:
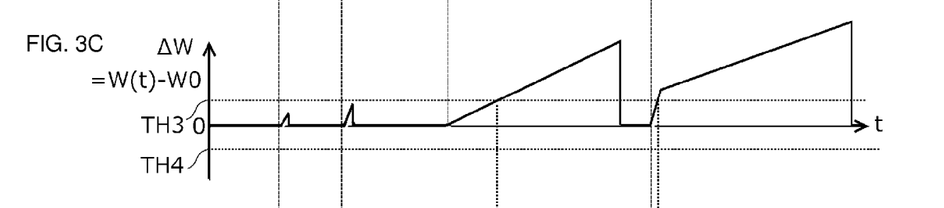

FIG. 3A is a diagram showing a dynamic load W(t) in a period when the load object 500 is ascending at a predetermined velocity. The dynamic load value W(t) has a time-dependent waveform indicated by the load signal SW from the load sensor 140. The dynamic load value W(t) actually indicates the constantly changing force applied to the load object 500. In FIG. 3A, as typical examples, the dynamic load value W(t) is shown corresponding to each time change waveform of the weak hitting A, the strong hitting B, the rubbing C and the hitting and rubbing D. FIG. 3B is a waveform of the time rate of change of the dynamic load value W(t), that is, the waveform of dW/dt generated by differentiating the dynamic load value W(t) from the load object 500 by time t. Up to immediately before the weak hitting A, the load object 500 is ascending at a predetermined velocity, hence the dynamic load value W(t) is a value of the static load value W0. Then the weak hitting A, the strong hitting B and the hitting and rubbing D can be detected based on the time rate of change by comparing each value with an appropriate threshold TH1, for example. If the time rate of change is a negative value, a negative threshold TH2 is used. FIG. 3C shows the deviation amount, that is, a difference $\Delta W(t)$ between the dynamic load value W(t) and the static load value W0. This difference $\Delta W$ takes a value that is not zero in all of the weak hitting A, the strong hitting B, the rubbing C and the hitting and rubbing D. Based on this difference $\Delta W$, rubbing C and hitting and rubbing D can be detected by comparing the difference $\Delta W$ with an appropriate threshold TH3. In this case as well, a negative threshold TH4 is used to detect negative deviation.

Referring to FIG. 2 again, the counterforce controller 100 performs control to generate different counterforces for the two contact states: hitting and rubbing respectively. At this time, the counterforce controller 100 according to this embodiment does not directly reflect the hitting and the rubbing on the counterforces respectively, but performs processing to enhance the hitting and the rubbing so that the operator can recognize the generation of the hitting and the rubbing more easily via the stick 112.

[1-2-1-1 Generation of Pulse Counterforce Based on Time Rate of Change]

Figure 3D:
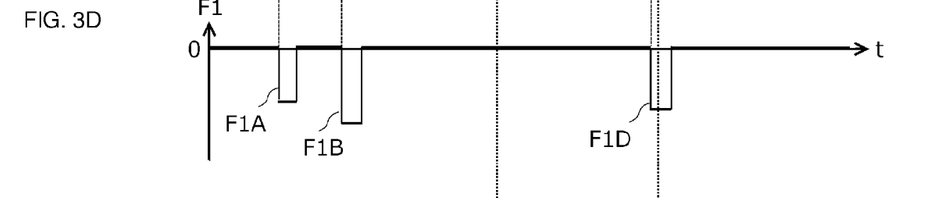

In concrete terms, for the counterforce corresponding to hitting, the counterforce controller 100 generates a pulse type counterforce so that the operator recognizes an isolated counterforce called "pulsed counterforce". The processing for this generation is performed by a pulsed counterforce controller 104, which is a part of the counterforce controller 100. A condition to generate the pulsed counterforce is whether or not the time rate of change of the dynamic load value W(t), indicated by the load signal SW, exists, in other words, whether or the dW/dt in FIG. 3B exceeds a threshold to detect collision. FIG. 3D shows a state where the pulsed counterforce F1 is generated corresponding to the detection that a value exceeding the threshold TH1 was acquired in the time rate of change of the dynamic load value W(t) (FIG. 3B). The ordinate of the graph indicates the direction and intensity of the force. Here the pulsed counterforce F1 is indicated in the negative direction because the force in a direction to return the stick 112 to the neutral position, which is being operated to ascend, is generated. The pulsed counterforce F1 is generated as the pulsed counterforce F1A, F1B or F1D, corresponding to each timing of the weak hitting A, the strong hitting B and the hitting and rubbing D respectively. Typically as seen in the weak hitting A and the strong hitting B, the period length where the time rate of change of the dynamic load value W(t) exceeds the threshold TH1 varies, but regardless the period length, the pulsed counterforces F1A, F1B and F1D are generated as pulsed forces having a predetermined time width. The height of the waveform of the pulsed counterforce F1A, F1B or F1D corresponds to the time rate of change. These heights have, for example, values corresponding to a peak value of the time rate of change of the dynamic load value W(t) or to an area of the portion which exceeds the threshold TH1 or does not reach TH2. In any case, the counterforce generator 116 generates the counterforce only when the time rate of change corresponding to the threshold TH1 or TH2 is detected. In the other periods, the counterforce generator 116 does not generate a counterforce unless the later mentioned rubbing is detected.

When the counterforce generator 116 does not generate a counterforce, the operator recognizes only the minimum force required for operation, which is received via the stick 112. This force is normally a static force generated by a mechanism, such as a spring, to return the stick 112 to the neutral position. Therefore as long as the position of the stick 112 is fixed, force from the stick 112 is constantly applied to the palm of the operator by a predetermined force of a spring. The operator is never conscious of the force of the spring. They can recognize the generation of hitting by tactile sense or force sense when the counterforce generator 116 generates the pulsed counterforce according to the presence of the time rate of change of the dynamic load value W(t) in this state. This means that the above mentioned processing to control the counterforce generator 116 is processing operation indicating a warning, combining the aspect of detecting the hitting based on the time rate of change and the aspect of generating the pulsed counterforce that can be easily recognized. Further, this processing is also an enhancement processing for the operator in terms of more easily detecting hitting by masking, that is, by suppressing the generation of the counterforce in a normal period where hitting is not detected.

[1-2-1-2 Generation of Counterforce from Deviation Amount]

Figure 3E:
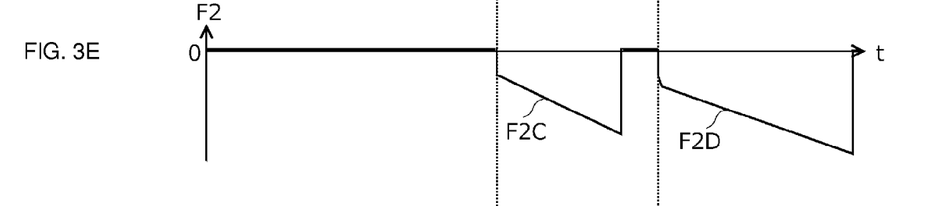
Figure 3F:
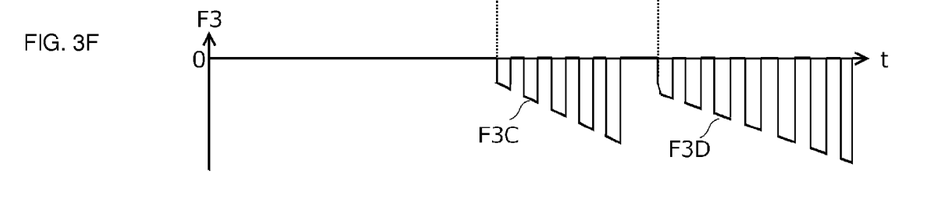

For the other generated counterforce corresponding to rubbing, a counterforce command signal SRF that allows the operator to recognize the counterforces, which are called "non-vibrating counterforce" and "vibrating counterforce", is outputted. This processing is performed by a deviation counterforce controller 106, which is a part of the counterforce controller 100. As a trigger to generate the non-vibrating counterforce or the vibrating counterforce, a deviation amount (FIG. 3C) of the load signal SW, which is generated by the load object 500 rubbing against a peripheral object, is used. FIG. 3E and FIG. 3F show the states where the non-vibrating counterforce F2 and the vibrating counterforce F3 are generated. Responding to the acquisition of a value exceeding the threshold TH3 as a difference $\Delta W$ (FIG. 3C) which is the deviation amount of the dynamic load value W(t), the non-vibrating counterforce F2 and the vibrating counterforce F3 are generated at the timings in the rubbing C and the hitting and rubbing D. In the rubbing C and the hitting and rubbing D, the difference $\Delta W$ changes along with time because of the change of the frictional force. This change is not always as large as the time rate of change, and is, for example, a value that does not exceed the threshold TH1 (FIG. 3B). However the operator can recognize the change of intensity of the rubbing if the non-vibrating counterforce F2 or the vibrating counterforce F3 is adjusted to the values corresponding to the value of the difference $\Delta W$. For example, the non-vibrating counterforces F2C and F2D in FIG. 3E and the vibrating counterforces F3C and F3D in FIG. 3F are values corresponding to the value of the difference $\Delta W$. In other words, the non-vibrating counterforce F2 (FIG. 3E) can correctly represent the change of the difference $\Delta W$. In this case as well, the values of the difference $\Delta W$ which do not reach the threshold TH3 are not reflected in the non-vibrating counterforce F2. Therefore only the recognition of significant rubbing can be enhanced by appropriately choosing the threshold TH3. The vibrating counterforce F3 (FIG. 3F) can be recognized by the operator, whereby the operator can recognize the generation of rubbing with enhanced intensity. In other words, the counterforces generated by the non-vibrating counterforce F2 and the vibrating counterforce F3 both have been processed to issue a warning, so that each counterforce is recognized with certainty when a deviation corresponding to the threshold TH3 is generated. This warning processing is also an enhancing processing for the operator, in terms of enhancing the detection of rubbing by masking the generation of counterforces during a normal period where rubbing is not detected.

[1-2-1-3 Superimposition of Counterforces]

The actual counterforces that the operator recognizes is the pulsed counterforce F1, the non-vibrating counterforce F2 and the vibrating counterforce F3 shown in FIG. 3D to FIG. 3F that are superimposed at an appropriate ratio, for example. This ratio is determined such that the pulsed counterforce F1, the non-vibrating counterforce F2 and the vibrating counterforce F3 can be distinguished from one another when necessary. In this example, the non-vibrating counterforce F2 shown in FIG. 3E and the vibrating counterforce F3 shown in FIG. 3F are generated using the thresholds TH3 and TH4, which are common to the counterforces F2 and F3, but in this embodiment, it is effective to set different the thresholds for generating the non-vibrating counterforce F2 and generating the vibrating counterforce F3. For example, in order to allow the operator to recognize the generation of rubbing with certainty, it is effective to generate the vibrating counterforce F3 when the difference ΔW is small, and to superimpose the non-vibrating counterforce F2 when the difference ΔW is large, so that the operator recognizes the actual intensity of rubbing. On the contrary, it is also effective to generate only the non-vibrating counterforce F2 when the intensity of rubbing is low, and to generate the vibrating counterforce F3 only when the intensity of rubbing becomes high. The actual values of the ratio and the threshold to start the generation of a counterforce can be appropriately determined based on the conditions of the embodiment, such as the type of information and the way the operator recognizes the information.

[1-2-1-4 Correction of Counterforce]

It is advantageous that the counterforce controller 100 includes not only the pulsed counterforce controller 104 and the deviation counterforce controller 106, but also a counterforce correction processor 108, which differs from the above controllers. The counterforce correction processor 108 is for correcting the counterforce command value. This correction is processing mainly to limit the direction of the counterforce. Moreover, the counterforce correction processor 108 corrects the counterforce command value, implemented as exceptional processing than the above processing.

In practical terms, the counterforce controller 100 is also installed as software on a programmable apparatus, such as a PLC and a computer. Now the operations of the pulsed counterforce controller 104, the deviation counterforce controller 106 and the counterforce correction processor 108 will be described in more detail.

[1-2-2 Detailed Operation of Pulsed Counterforce Controller 104]

As a typical operation, the pulsed counterforce controller 104 first receives a dynamic load signal SW which indicates the dynamic load value from the load sensor 140. Then the pulsed counterforce controller 104 calculates the time rate of change of the dynamic load value. For this, the time rate of change may be calculated directly from the dynamic load value of the load signal SW, or the deviation amount, which is a difference of the dynamic load value indicated by the load signal SW from the static load value of the load object 500, and may be calculated first, thereafter the time rate of change is calculated from the deviation amount. Then the pulsed counterforce controller 104 outputs a counterforce command signal SRF which indicates a counterforce command value to generate the pulsed counterforce according to the presence of the time rate of change. The pulsed counterforce is, as exemplified in FIG. 3D, an isolated pulse type counterforce for generating a counterforce, which the operator can recognize for a certain length of time (e.g. for 0.1 seconds). The counterforce command value for the pulsed counterforce is provided as a pulsed time change waveform that indicates the time change of the counterforce. This waveform of the counterforce can be any waveform of a counterforce that is appropriate for the operator to recognize the generation of hitting by tactile sense or by force sense via the stick 112, and typical examples of such a waveform are a rectangular wave and a triangular wave. Then the counterforce command signal SRF, which indicates the counterforce command value of the pulsed counterforce, is outputted from the counterforce generator 116. The operation force that the operator recognizes via the stick 112 changes from a force that does not indicate any particular time change, such as the force from the spring that returns the stick 112 to the neutral position, to a force that includes a pulsed counterforce which the counterforce generator 116 generates under control of the pulsed counterforce controller 104. Therefore the operator can also recognize the generation of hitting via the stick 112.

It is particularly advantageous that the pulsed counterforce controller 104 outputs the counterforce command signal SRF after setting the value for specifying the amplitude of the pulsed counterforce, out of the counterforce command values, to a value corresponding to the time rate of change of the load signal SW. If the operator can not only recognize the hitting by an enhanced counterforce but also recognize the intensity of the hitting by the counterforce, then the operator can acquire even more detailed information on an event that is generated during the lifting operation of the load object 500.

Furthermore, in the pulsed counterforce controller 104, it is advantageous that the counterforce command value, indicated by the counterforce command signal SRF, is a value by which the pulsed counterforce controller 104 does not generate a counterforce in a direction to move the stick 112 away from the neutral position, based on at least either the input coordinate value or the velocity command value. In this case, the pulsed counterforce controller 104 further receives at least either the input coordinate signal SP or the velocity command signal SV. The phrase "velocity related signal" may be used to indicate either the input coordinate signal SP or the velocity command signal SV, since the input coordinate signal SP and the velocity command signal SV are related to velocity. The neutral position here refers to a position of the stick 112 on one input axis, where the velocity command value corresponding to the input coordinate value SP, when the stick 112 is in this neutral position, becomes a value to stop the load object 500. By this configuration, the counterforce can be generated in the direction to move the stick 112 toward the neutral position.

For example, it is assumed that the load lifting device 130 lifts the load object 500 up when the input coordinate value of the stick 112 is positive. In this case, if the load object 500 hits another object during ascending, the load value of the load signal SW increases at that moment, and the time rate of change becomes a positive value. Based on this positive time rate of change, the pulsed counterforce controller 104 calculates a counterforce command value with which the input coordinate sensor 114 generates a counterforce to move the stick 112 in the negative direction. If the counterforce is generated merely by inverting the sign when the time rate of change of the load signal SW becomes a negative value by the load object 500 hitting another object during ascending, the pulsed counterforce controller 104 calculates a counterforce command value with which the input coordinate sensor 114 generates a counterforce to move the stick 112 in the positive direction. This however is a counterforce in a direction to further increase the ascending velocity of the load object 500. If the operator operates the stick 112 according to this counterforce, or allows the movement of the stick 112 by the counterforce, the manual operation from the neutral position by the operator is advanced by the counterforce. Therefore it is important that the pulsed counterforce controller 104 does not generate a counterforce in such a direction. If the time rate of change of the load value of the load signal SW becomes a negative value by the load object 500 hitting during ascending, the load value decreases due to the hitting and rubbing, as indicated by the down arrow in FIG. 3B, for example.

[1-2-3 Detail Operation of Deviation Counterforce Controller 106]

Now the deviation counterforce controller 106 will be described. The deviation counterforce controller 106 receives the dynamic load signal SW which indicates the dynamic load value from the load sensor 140, and calculates the deviation amount, which is a difference of the dynamic load value from the static load value of the load object 500. Then the deviation counterforce controller 106 outputs the counterforce command signal SRF, which indicates the counterforce command value to generate a counterforce according to the presence of the deviation amount, to the counterforce generator 116.

It is advantageous that the deviation counterforce controller 106 outputs the counterforce command signal SRF to the counterforce generator, including the counterforce command value for generating the non-vibrating counterforce according to the value of the deviation amount. The non-vibrating counterforce is generated by the deviation amount of the dynamic load value corresponding to increase or decrease of the dynamic load value from the static load value, due to the generation of rubbing. Therefore if the load objet 500 ascending or descending at a predetermined velocity is rubbed against a peripheral object at a certain point of time, the operator, who previously had no sense of a counterforce via the stick 112 up to this point, recognizes the counterforce from this point on.

It is advantageous that the deviation counterforce controller 106 outputs the counterforce command signal SRF including the counterforce command value for generating the vibrating counterforce according to the deviation amount. The vibrating counterforce allows the operator to recognize vibration via the stick 112, and is typically implemented by intermittently repeating the pulsed counterforce. The vibrating counterforce can easily be recognized even if the amplitude of the vibration is small, therefore it is an effective method to enhance the load value that is increased by the frictional force due to rubbing. In order to adapt the amplitude of the vibrating counterforce to the deviation amount, it is advantageous that the amplitude is in proportion to the deviation amount, or to correspond to the deviation amount non-linearly.

In this embodiment, it is preferable that the deviation counterforce controller 106 limits the direction of the counterforce, just like the pulsed counterforce controller 104. For this purpose, the deviation counterforce controller 106 also receives at least either the input coordinate signal SP or the velocity command signal SV, that is, a velocity related signal.

Further, the deviation counterforce controller 106 calculates, based on at least either the input coordinate value SP or the velocity command value SV, the counterforce command value indicated by the counterforce command signal SRF, which is a value that does not generate the counterforce in a direction to move the stick 112 away from the neutral position on one input axis of the stick 112.

[1-2-4 Detailed Operation of Counterforce Correction Processor 108]

As mentioned above, it is advantageous that the counterforce controller 100 of this embodiment further includes the counterforce correction processor 108. The counterforce correction processor 108 receives at least either the input coordinate signal SP or the velocity command signal SV, and the counterforce command signal SRF. The counterforce correction processor 108 also determines a value that generates a counterforce in a direction to move the stick 112 away from the neutral position on one input axis of the stick 112, out of the counterforce command values indicated by the counterforce command signal SRF, based on at least either the input coordinate value or the velocity command value. For this, the input coordinate signal SP is inputted to the counterforce correction processor 108, as shown in FIG. 2. Then the counterforce correction processor 108 selectively replaces this value with a value that does not generate a counterforce. Thereby a corrected counterforce command value is acquired, and a corrected counterforce command signal SRF-M, which indicates the corrected counterforce command value, is received from the counterforce correction processor 108.

In this case, the counterforce generator 116 of the joystick device 110 receives the corrected counterforce command signal SRF-M from the counterforce correction processor 108 instead of the counterforce command signal SRF, and generates the counterforce in a direction to change the input coordinate value SP on one input axis, according to the corrected counterforce command value.

By this configuration, the counterforce in a direction to move the stick 112 toward the neutral position is generated (hereafter called "counterforce direction limiting processing"). Actually the counterforce direction limiting processing by the counterforce correction processor 108 is rarely executed during normal operation if the pulsed counterforce controller 104 or deviation counterforce controller 106 has the preferred configuration mentioned above. This is because the pulsed counterforce controller 104 and the deviation counterforce controller 106 determine the direction of the counterforce based on the input coordinate value of the input coordinate signal SP or the velocity command signal SV, or the velocity command value, at most of the time when the counterforce command signal SRF is calculated. Still there is a case when the counterforce in the direction to move the stick 112 away from the neutral position is generated at the time of the counterforce generator 116 generating the counterforce if the pulsed counterforce controller 104 or the deviation counterforce controller 106 directly uses the counterforce command value, therefore the counterforce direction limiting processing is used. For example, it is possible that the stick 112 is operated toward an opposite side over the neutral position in a period when the pulsed counterforce is generated by the pulsed counterforce controller 104. Moreover, calculation of the time rate of change by the pulsed counterforce controller 104 is normally sensitive to noise, and also may be affected by an error in numerical calculation. Even in such cases, the generation of a counterforce in a direction to move the stick 112 away from the neutral position can be prevented if the counterforce correction processor 108 performs the counterforce direction limiting processing.

Furthermore, it is advantageous that the counterforce correction processor 108 selectively replaces the corrected counterforce command value, when at least either the input coordinate value or the velocity command value is indicating a value to stop the load object 500, with a value that does not generate a counterforce. Thereby the counterforce correction processor 108 receives the corrected counterforce command value, and outputs the corrected counterforce command signal SRF-M. This processing (hereafter called "stop time counterforce limiting processing") is performed because generating a counterforce here results in generation of a counterforce counter to the operational intension of the operator. In other words, if the position of the stick 112 acquired from the input coordinate signal SP or the velocity command signal SV is a neutral position, this means that the operator has returned the stick 112 to the neutral position with the intention to stop the operation, or the stick 112 is in the neutral position by the force of the spring. Therefore considering this state, it is appropriate to limit the generation of the counterforce.

1-3 Modification of Embodiment 1

In the above mentioned remote handling apparatus 1000, the pulsed counterforce controller 104 and the deviation counterforce controller 106 of the counterforce controller 100 were described separately. From a practical point of view, it is also advantageous that a counterforce command value, generated by adding the signals from both the pulsed counterforce controller 104 and the deviation counterforce controller 106 shown in FIG. 2, is used as the counterforce value. For example, in the case when the load object 500 contacts a peripheral object with a slight initial hit and then rubs against the object, the pulsed counterforce controller 104 and the deviation counterforce controller 106 individually calculate counterforce command values for the pulsed counterforce corresponding to the hitting at initial contact and the counterforce corresponding to the rubbing. If a counterforce command signal SRF added with these values is generated, the operator can recognize the state of whether the contact of the load object 500 with the peripheral object is temporary or is continuing by rubbing (friction) by the counterforce via the stick 112.

2. Embodiment 2

2-1 Addition of Exiting Remote Handling Apparatus

The above mentioned remote handling apparatus 1000 can be implemented by adding some apparatuses to the existing remote handling apparatus, such as the conventional remote handling apparatus 7000 (FIG. 1). Embodiment 2 of the present invention will now be described as an auxiliary apparatus that is added to the existing remote handling apparatus. FIG. 2 will be referred to continuously.

An auxiliary apparatus 1200 of this embodiment is added to a remote handling apparatus of a load object, which allows an operator, who is manually operating a load lifting device in a remote area using a joystick device, to recognize a counterforce via the stick. For example, when the conventional remote handling apparatus 7000 shown in FIG. 1 has been installed, the auxiliary apparatus 1200 including the counterforce controller 100 and the counterforce generator 116 is added thereto, then the remote handling apparatus 1000 can be substantially created merely by inputting the load signal SW and the input coordinate signal SP to the counterforce controller 100. In this case, the pulsed counterforce controller 104 and the deviation counterforce controller 106 of the counterforce controller 100 may be added separately or added together as needed. The counterforce correction processor 108 may also be added if necessary.

In an actual operation to add functions equivalent to the remote handling apparatus 1000, by adding the auxiliary apparatus 1200 to the existing remote handling apparatus, a commonly known modification can be added to implement this embodiment. For example, instead of adding the counterforce generator 116 to the joystick device 710 (FIG. 1) to implement the configuration of the joystick device 110, a joystick device 110 having the functions of the counterforce generator 116 may be used. If the lifting controller 120 has already been installed as software, the operation to add the counterforce controller 100 may be performed merely by modifying this software. These actual additional operations can be appropriately performed by an individual skilled in the art according to a specific configuration of the remote handling apparatus.

3. Installation Examples

3-1 Counterforce Controller 100 Installed as Software

Figure 4:
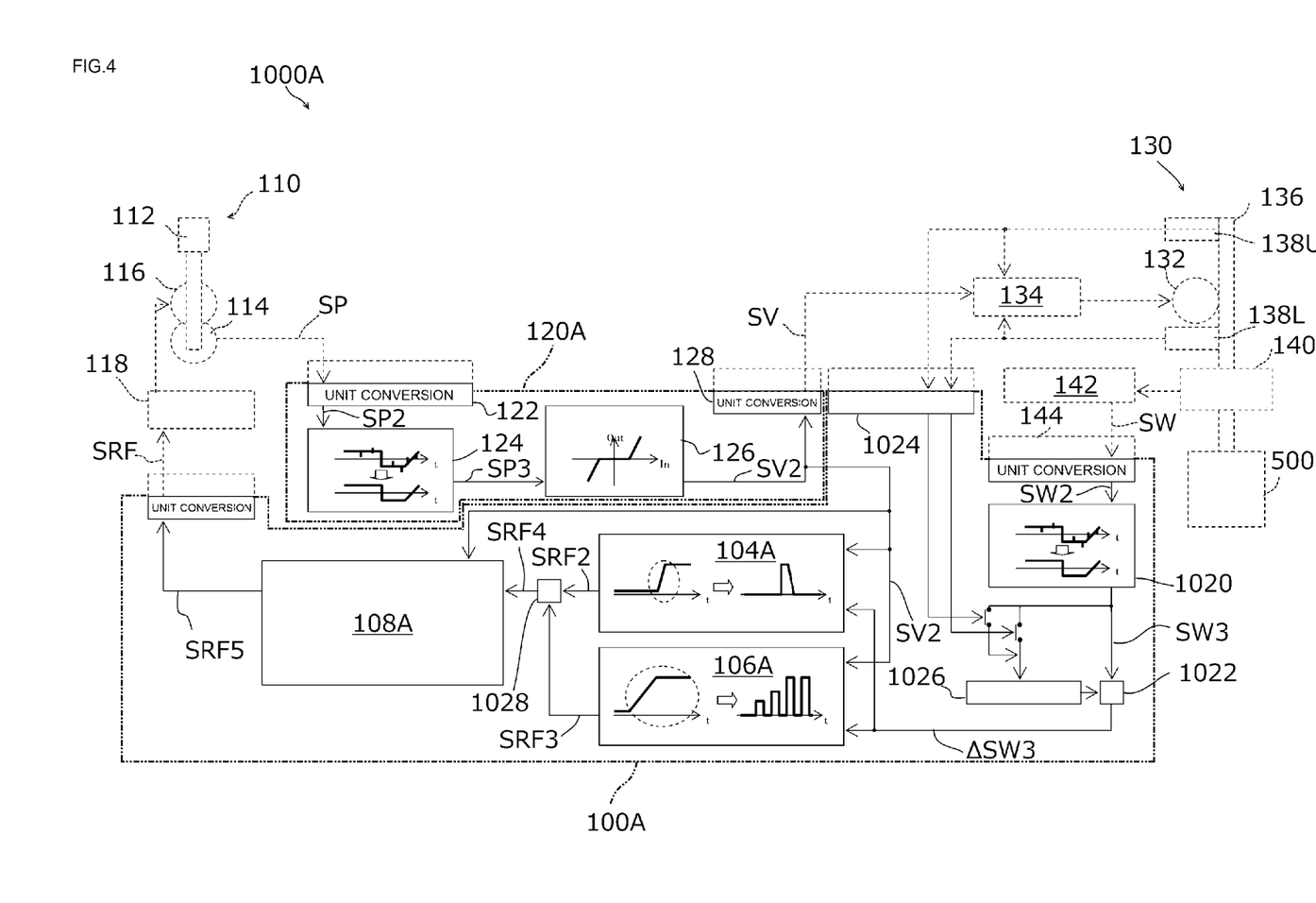
FIG. 4 is a block diagram depicting the configuration of the remote handling apparatus according to an embodiment of the present invention, that includes an example of configurations of a counterforce controller and a lifting controller installed as software.

Now an installation example of the counterforce controller 100 as software will be described with reference to FIG. 4. FIG. 4 is a block diagram depicting the general configuration of a remote handling apparatus 1000A, that includes a configuration example of the counterforce controller and the lifting controller are installed as software in the remote handling apparatus 1000 shown in FIG. 2. FIG. 4 is a software configuration example when an evaluation system according to Embodiment 1 of the present application is fabricated, and can also be a configuration example of an evaluation system according to Embodiment 2 of the present application. Here in order to assist in understanding the fabricated evaluation system, the software and the hardware are distinguished by indicating the software components by solid lines, and the hardware components by chained lines. In this installation example, description on the display device 150, the camera and the display devices for images is omitted. In the following description, a component substantially the same as a component described in FIG. 2 is denoted with the same reference symbol, where redundant description is omitted. To maintain correspondence with already described terms, the components implemented by software modules and the data exchanged between components are described using the above mentioned component names of processors and signals. Furthermore, a component, which has a difference only due to installation on the basis of software, is described with a related symbol affixed with an alphabetic character or numeric character. The method, processing content, processing procedure, components, concrete processing or the like in the following installation example can appropriately be changed within a scope not departing from the true spirit of the present invention. Therefore the scope of the present invention is not limited by the following examples.

[3-1-1 Software-Based Lifting Controller 120A]

The input coordinate signal SP from the joystick device 110 is inputted to a lifting controller 120A. The lifting controller 120A executes functions equivalent to those of the lifting controller 120 shown in FIG. 2. In other words, by the lifting controller 120A, a velocity command signal SV which indicates the velocity command value is generated from the input coordinate value indicated by the input coordinate signal SP, and is outputted and transferred to the load lifting device 130. In concrete terms, the input coordinate value, which is an analog value indicated by the input coordinate signal SP from the input coordinate sensor 114, connected to the stick 112 of the joystick device 110, is converted into a digital value by an AD convertor 122 that adjusts the scale (hereafter this processing is called "unit conversion"). By this conversion, the input coordinate signal SP is converted into the input coordinate signal SP2, which indicates an input coordinate value in a −100 to +100% numerical range, for example. The plus and minus of the input coordinate value indicated by the input coordinate signal SP2 are assigned to the ascending and the descending of the load object 500 respectively, for example, with 0 corresponding to stopping. The input coordinate value in this stage may include noise, hence noise is removed by an appropriate filter processor 124. Then [the input coordinate value] becomes an input coordinate signal SP3 that indicates an input coordinate value in a −100 to +100% numerical range, and is converted, by a velocity command convertor 126, into the velocity command signal SV2 which indicates a velocity command value of the motor. The velocity command value indicated by the velocity command signal SV2 is, for example, a value in a −100 to +100% numerical range, and is in proportion to the velocity of the load motor 132. Thus the velocity command convertor 126 substantially determines the correspondence of the input coordinate value of the stick 112 and the velocity of the load motor 132.

The velocity command convertor 126 performs, for example, non-linear conversion such that the load object can move quickly but can also move slightly near the stop position. The velocity command value indicated by the velocity command signal SV2 is converted into the velocity command signal SV having an appropriate voltage range for the load motor 132 (unit conversion) by a DA convertor 128, for example, and is outputted. A load motor driving power supply 134 is connected to the load motor 132 of the load lifting device 130, and a current signal, which has been amplified to operate the load motor 132 at a velocity in proportion to the velocity command signal SV, is outputted from the load motor driving power supply 134. An multiplication/reduction mechanism, such as gears (not illustrated), is connected to the load motor 132. Thus the load object 500 is ascended, stopped or descended directly by the load motor 132 at a velocity in proportion to the velocity command value indicated by the velocity command signal SV, according to the input coordinate value indicated by the input coordinate signal SP from the joystick device 110. An upper limit switch 138L and a lower limit switch 138U are installed on a lifting shaft 136, which is a shaft to lift the load object 500, to detect the load object reaching a limit of the moving distance.

A load sensor 140 is installed in an appropriate position, and outputs a measurement signal of the dynamic load value of the load object 500. This measurement signal becomes the load signal SW through a load cell convertor 142, and is inputted to the counterforce controller 100A via a load cell interface 144. The load signal SW is converted into the load signal SW2 (unit conversion) when the counterforce controller 100A inputs the load signal SW. The counterforce controller 100A generates the counterforce command signal SRF for generating a counterforce.

[3-1-2 Software Based Counterforce Controller 100A]

The counterforce controller 100A generates a load signal SW3 from the load value indicated by the load signal SW2 by removing noise using an appropriate filter 1020. Based on this load signal SW3, the static load value is determined depending on the load value when the load object 500 remains still. In concrete terms, the load signal SW3 is sampled when either the lower limit switch 138U or the upper limit switch 138L indicates that the load object 500 is at the upper end or the lower end of the lifting shaft 136, and this load value is stored in a static load memory 1026. For this operation, the counterforce controller 100 includes an upper/lower end input unit 1024 that accepts an input from the lower limit switch 138U or upper limit switch 138L. Another purpose of the lower limit switch 138U and the upper limit switch 138L is to limit the operation of the load motor 132 within a range from the upper end to the lower end by inputting the detection of these switches to the load motor driving power supply 134 that controls the operation of the load motor 132.

Then the difference between the static load value of the static load memory 1026 and the dynamic load value of the load signal SW3 is calculated by a difference processor 1022 as the deviation amount ΔSW3. This deviation amount ΔSW3 is inputted to the pulsed counterforce controller 104A and the deviation counterforce controller 106A.

The counterforce controller 104A calculates the time rate of change from the deviation amount ΔSW3, and generates the counterforce value for the pulsed counterforce if the absolute value of the time rate of change exceeds a certain threshold, that is, the time rate of change threshold. Here the time rate of change threshold is set to such a value that the time rate of change calculated from the deviation amount ΔSW3 exceeds this value when the load object 500 hits a peripheral object and impact is generated. For example, if a hitting occurs when the load object 500 is ascending, the load signal SW3, which increases from the static load value stored in the static load memory 1026, is acquired. As a result, the deviation amount ΔSW3 indicates a large time rate of change in the positive direction. At this time, the pulsed counterforce controller 104A calculates the counterforce command value to generate the pulsed counterforce having isolated pulses for a certain time period. This means that the pulsed counterforce is generated, according to the time rate of change. The origin of the time change of the deviation amount ΔSW3 is the time change of the load signal SW. Examples of the time rate of change threshold are the thresholds TH1 and TH2 shown in FIGS. 3A-3F.

The counterforce command value to generate the pulsed counterforce calculated by the pulsed counterforce controller 104A is for generating the pulsed counterforce in a direction to return the stick 112 to the neutral position, and a counterforce in a direction to move the stick 112 away from the neutral position is not generated. To calculate such a counterforce command value, the input coordinate value or the velocity command value of the stick 112 must be used. For this purpose in this example, the velocity command signal SV2 is inputted from the lifting controller 120A to the pulsed counterforce controller 104A in this installation example, which is unlike the pulsed counterforce controller 104, where the input coordinate signal SP is inputted to the remote handling apparatus 1000 shown in FIG. 2. Furthermore, while input of the pulsed counterforce controller 104 in the remote handling apparatus 1000 is the load signal SW, input of the pulsed counterforce controller 104A is the deviation amount ΔSW3, which is the difference from the static load value. This aspect however is not a substantial difference in terms of calculating the time rate of change.

Then the pulsed counterforce controller 104A calculates the counterforce command value, and outputs the value as the counterforce command signal SRF2.

The deviation counterforce controller 106A calculates a counterforce command value to generate the vibrating counterforce or repeating pulsed counterforce. In this case as well, the counterforce in a direction to move the stick 112 away from the neutral position is not generated. Therefore the velocity command signal SV2 is inputted to the deviation counterforce controller 106A as well from the lifting controller 120A, in addition to the deviation amount ΔSW3. In this aspect, this installation example is different from the deviation counterforce controller 106 of the remote handling apparatus 1000 in FIG. 2, where the input coordinate signal SP is inputted. Furthermore, while the input of the deviation counterforce controller 106 of the remote handling apparatus 1000 is the load signal SW, the input of the deviation counterforce controller 106A is the deviation amount ΔSW3, which is the difference from the static load. Therefore the operation of the deviation counterforce controller 106 includes the operation of the deviation counterforce controller 106A of the remote handling apparatus 1000A and the operation of the difference processor 1022, the upper/lower end input unit 1024 and the static load memory 1026.

Then the deviation counterforce controller 106A calculates the counterforce command value, and outputs the value as the counterforce command signal SRF3. If the absolute value of the deviation amount ΔSW3 exceeds a certain threshold, that is, a deviation amount threshold, the deviation counterforce controller 106A generates the counterforce command signal SRF3 for the non-vibrating counterforce (FIG. 3E) or the vibrating counterforce (FIG. 3F). Here the deviation amount threshold is selected as a value such that the deviation amount ΔSW3 exceeds this value when the load object 500 rubs against a peripheral object and friction is generated. For example, if rubbing occurs when the load object 500 is ascending, the load signal SW3, which increases from the static load value in the static load memory 1026, is acquired. As a result, the deviation amount ΔSW3 indicates a positive deviation value. At this time, the deviation counterforce controller 106A calculates the counterforce command value for generating a non-vibrating counterforce or the vibrating counterforce if the deviation amount ΔSW3 exceeds the deviation amount threshold. This means that the pulsed counterforce is generated, according to the time rate of change. Examples of the deviation amount threshold are the thresholds TH3 and TH4 shown in FIGS. 3A-3F.

The counterforce command value indicated by the counterforce command signal SRF2 from the pulsed counterforce controller 104A and the counterforce command value indicated by the counterforce command signal SRF3 from the deviation counterforce controller 106A are superimposed by an addition processor 1028, and inputted to a counterforce correction processor 108A as the counterforce command signal SRF4. The counterforce correction processor 108A performs correction processing on the counterforce command value indicated by the counterforce command signal SRF4, so that an appropriate counterforce is generated. The velocity command signal SV2 is also inputted to the counterforce correction processor 108A for the above mentioned correction processing. In this aspect, the counterforce correction processor 108A of this installation example is different from the counterforce correction processor 108 where the input coordinate signal SP shown in FIG. 2 is inputted. There are four specific processes that the counterforce correction processor 108A performs: (1) the counterforce correction value is set to 0 if the velocity command signal SV2 is 0, regardless of the value of the counterforce command signal SRF4; (2) the counterforce correction value is set to 0 if the direction of the counterforce indicated by the counterforce command signal SRF4 and the direction of the stick 112 are the same; (3) if a value of the counterforce command signal SRF4 exceeds the upper limit, this counterforce command value is set as the upper limit; and (4) in cases other than (1) to (3), the value of the counterforce command signal SRF4 is directly outputted. The processes of (1) and (2) concern the stop time counterforce limiting processing, and the counterforce direction limiting processing described in section "1-2-4 Detailed operation of counterforce correction processor 108".

The output of the counterforce correction processor 108A becomes a counterforce command signal SRF5, and is converted by unit conversion and outputted to the motor driving power supply 118 as the counterforce command signal SRF. The counterforce generator 116 is driven by the output current from the motor driving power supply 118, and generates the counterforce for the operator to recognize via the stick 112, according to the control operation of the counterforce controller 100. By this control operation, hitting and rubbing of the load object 500 with a peripheral object can be appropriately detected, and an enhanced counterforce allowing the operator to feel easily the sensation of operation can be generated, as exemplified in the counterforce in FIGS. 3A-3F.

The inventors of the present application actually confirmed the effectiveness of the remote handling apparatus 1000 of Embodiment 1 by adjusting various parameters in an evaluation system of the remote handling apparatus 1000A. In other words, in terms of the counterforce shown in FIGS. 3A-3F, the operator was able to recognize the hitting and rubbing of the load object 500 with a peripheral object by the pulsed counterforce F1, the non-vibrating counterforce F2 and the vibrating counterforce F3 via the stick 112, even when the operator was not paying attention to the ascending/descending operation of the load object 500. At this time, the operator was able to distinguish hitting from rubbing. When hitting and rubbing occurred at the same time, such as in the case of hitting and rubbing D (FIG. 3A), the operator was able to recognize the continuation of the hitting and rubbing. The operator was also able to distinguish the pulsed counterforce F1A from the pulsed counterforce F1B, and recognize the state when the counterforce changed in the non-vibrating counterforces F2C and F2D and the vibrating counterforces F3C and F3D respectively. The parameter adjusted in the above confirmation in the evaluation system of the remote handling apparatus 1000A is at least one of the following: thresholds TH1, TH2, TH3 and TH4, the respective intensity of the pulsed counterforce F1, non-vibrating counterforce F2 and vibrating counterforce F3, relative balance thereof, a period of the pulsed counterforce F1, an alternate cycle and a period of pulse of the vibrating counterforce F3, and an upper limit of the counterforce command value in the counterforce correction processor 108A.

Various embodiments of the present invention have been concretely described. The embodiments and installation example described above have been presented for illustrative purposes and not to limit the scope of the present invention, which is defined by the Claims and their equivalents. Modifications that exist within the scope of the present invention, including combinations of aspects of the illustrated embodiments, are included in the Claims.

INDUSTRIAL APPLICABILITY

The remote handling apparatus according to the present invention or the auxiliary apparatus thereof can be applied to any apparatus used for manually operating a load object in a remote location.

DESCRIPTION OF THE REFERENCE NUMERALS 1000 remote handling apparatus
1200 auxiliary apparatus
500 load object
100, 100A counterforce controller
1020 filter
1022 difference processor
1024 upper/lower end input unit
1026 static load memory
1028 addition processor
104, 104A pulsed counterforce controller
106, 106A deviation counterforce controller
108, 108A counterforce correction processor
110 joystick device
112 stick
114 input coordinate sensor
116 counterforce generator
118 motor driving power supply
120, 120A lifting controller
122 AD convertor
124 filter processor
126 velocity command convertor
128 DA convertor
130 load lifting device
132 load motor
134 load motor driving power supply
136 lifting shaft
138L upper limit switch
138U lower limit switch
140 load sensor
142 load cell convertor
144 load cell interface
150 display device
TH1 to TH4 threshold
SP, SP2, SP3 input coordinate signal
SV, SV2 velocity command signal
SW, SW2, SW3 load signal
SRF, SRF2 to SRF5 counterforce command signal Although a few embodiments have been shown and described, it would be appreciated by those skilled in the art that changes may be made in these embodiments without departing from the principles and spirit of the invention, the scope of which is defined in the claims and their equivalents.

What is claimed is:

1. A remote handling apparatus for a load object, comprising:
    a joystick device in which a counterforce generator, which generates a counterforce to allow an operator to recognize the counterforce via a stick that accepts manual operation according to a value indicated by a received-counterforce command signal, is connected to the stick;
    a load lifting device that is installed away from the joystick device and that allows a load object to ascend, stop or descend according to either an input coordinate value of the stick or a velocity command value corresponding to the input coordinate value; and
    a pulsed counterforce controller that calculates a time rate of change of a dynamic load value of the load object and that outputs a counterforce command signal, which indicates a counterforce command value for generating a pulsed counterforce according to the time rate of change, to the counterforce generator.

2. The remote handling apparatus according to claim 1, wherein
    the pulsed counterforce controller outputs the counterforce command signal after setting a value to specify amplitude of the pulse counterforce, out of counterforce command values, to a value corresponding to the time rate of change.

3. The remote handling apparatus according to claim 1, wherein
    the pulsed counterforce controller receives a velocity related signal which indicates at least either the input coordinate value or the velocity command value, and
    the value indicated by the counterforce command signal is calculated by the pulsed counterforce controller, based on at least either the input coordinate value or the velocity command value, as a value that does not generate a counterforce in a direction to move the stick away from a neutral position.

4. The remote handling apparatus according to claim 1, wherein
    the time rate of change is generated by the load object colliding with a peripheral object.

5. A remote handling apparatus for a load object, comprising:
    a joystick device in which a counterforce generator, which generates a counterforce to allow an operator to recognize the counterforce via a stick that accepts manual operation according to a value indicated by a received-counterforce command signal, is connected to the stick;
    a load lifting device that is installed away from the joystick device, and allows a load object to ascend, stop or descend according to either an input coordinate value of the stick or a velocity command values corresponding to the input coordinate value; and
    a deviation counterforce controller that calculates a deviation amount indicating a difference of a dynamic load value from a static load value of the load object, and that outputs a counterforce command signal indicating a counterforce command value to the counterforce generator according to the presence of the deviation amount.

6. The remote handling apparatus according to claim 5, wherein
    the deviation counterforce controller outputs the counterforce command signal including a counterforce command value for generating non-vibrating counterforce to the counterforce generator according to the value of the deviation amount.

7. The remote handling apparatus according to claim 5, wherein
    the deviation counterforce controller outputs the counterforce command signal including a counterforce command value for generating vibrating counterforce to the counterforce generator according to the value of the deviation amount.

8. The remote handling apparatus according to claim 5, wherein
    the deviation counterforce controller receives a velocity related signal indicating at least either the input coordinate value or the velocity command value,
    the value indicated by the counterforce command signal is calculated by the deviation counterforce controller, based on at least either the input coordinate value or the velocity command value, as a value that does not generate a counterforce in a direction to move the stick away from the neutral position,
    whereby the counterforce is generated in a direction to move the stick toward a neutral position.

9. The remote handling apparatus according to claim 5, wherein
the deviation amount is generated by the load object rubbing against a peripheral object.

10. The remote handling apparatus according to claim 1, further comprising,
a counterforce correction processor that receives a velocity related signal indicating at least either the input coordinate value or the velocity command value, determines, based on at least either the input coordinate value or the velocity command value, a value generating the counterforce in a direction to move the stick away from the neutral position, out of values indicated by the counterforce command signal, and selectively replaces this value with a value that does not generate the counterforce, so as to acquire a corrected counterforce command value, and outputs a corrected counterforce command signal indicating the corrected counterforce command value, wherein
the counterforce generator of the joystick device receives the corrected counterforce command signal from the counterforce correction processor, instead of the counterforce command signal, and generates a counterforce in a direction to change the input coordinate value according to the corrected counterforce command value, whereby the counterforce is generated in a direction to move the stick toward the neutral position.

11. The remote handling apparatus according to claim 5, further comprising:
a counterforce correction processor that receives a velocity related signal indicating at least either the input coordinate value or the velocity command value, determines, based on at least either the input coordinate value or the velocity command value, a value generating the counterforce in a direction to move the stick away from the neutral position, out of values indicated by the counterforce command signal, and selectively replaces this value with a value that does not generate the counterforce, so as to acquire a corrected counterforce command value, and outputs a corrected counterforce command signal indicating the corrected counterforce command value, wherein
the counterforce generator of the joystick device receives the corrected counterforce command signal from the counterforce correction processor, instead of the counterforce command signal, and generates a counterforce in a direction to change the input coordinate value according to the corrected counterforce command value, whereby the counterforce is generated in a direction to move the stick toward the neutral position.

12. The remote handling apparatus according to claim 10, wherein
the counterforce correction processor selectively replaces the corrected counterforce command value, when at least either the input coordinate value or the velocity command value is a value to stop the load object, with a value that does not generate counterforce, so as to acquire the corrected counterforce command value, and outputs the corrected counterforce command signal.

13. A remote handling apparatus for a load object, comprising:
a joystick device including an input coordinate sensor that detects an input coordinate value of one input axis of a stick that accepts manual operation from an operator, and a counterforce generator that is connected to the stick to generate counterforce to allow the operator to recognize the counterforce via a stick according to a value indicated by a received counterforce command signal;
a lifting controller that receives an input coordinate signal indicating the input coordinate value from the input coordinate sensor and that outputs a velocity command signal indicating a velocity command value corresponding to the input coordinate value;
a load lifting device that is installed away from the joystick device, receives the velocity command signal, and allows a load object to ascend, stop or descend according to the velocity command value;
a load sensor installed to detect a dynamic load value of the load object; and
a pulsed counterforce controller that receives a dynamic load signal indicating the dynamic load value from the load sensor, calculates a time rate of change of either the deviation amount, which is a difference of the dynamic load value from a static load value of the load object, or the dynamic load value, and outputs a counterforce command signal indicating a counterforce command value for generating a pulsed counterforce to the counterforce generator according to the presence of the time rate of change.

14. A remote handling apparatus for a load object, comprising:
a joystick device including an input coordinate sensor that detects an input coordinate value of one input axis of a stick that accepts manual operation from an operator, and a counterforce generator that is connected to the stick to generate counterforce to allow the operator to recognize the counterforce via a stick according to a value indicated by a received counterforce command signal;
a lifting controller that receives an input coordinate signal indicating the input coordinate value from the input coordinate sensor, and outputs a velocity command value corresponding to the input coordinate value;
a load lifting device that is installed away from the joystick device, receives the velocity command signal, and allows a load object to ascend, stop or descend according to the velocity command value;
a load sensor installed to be able to detect a dynamic load value of the load object; and
a deviation counterforce controller that receives a dynamic load signal indicating the dynamic load value from the load sensor, calculates a deviation amount, which is a difference of the dynamic load value from a static load value of the load object, and outputs to the counterforce generator a counterforce command signal indicating a counterforce command value according to the presence of the deviation amount.

15. The remote handling apparatus according to claim 13, further comprising:
a counterforce correction processor that receives at least either the input coordinate signal or the velocity command signal and the counterforce command signal, determines, based on at least either the input coordinate value or the velocity command value, a value that generates a counterforce in a direction to move the stick away from a neutral position on one input axis, out of values indicated by the counterforce command signal, selectively replaces this value with a value that does not generate a counterforce so as to acquire a corrected counterforce command value, and outputs a corrected counterforce command signal indicating the corrected-counterforce command value, wherein the counterforce correction processor selectively replaces the corrected-counterforce command value, when at least either the input coordinate value or the velocity command value is a value to stop the load object, with a value that does not generate counterforce, so as to acquire the corrected counterforce command value, and outputs the corrected counterforce command signal.

16. The remote handling apparatus according to claim 14, further comprising:
a counterforce correction processor that receives at least either the input coordinate signal or the velocity command signal and the counterforce command signal, determines, based on at least either the input coordinate value or the velocity command value, a value that generates a counterforce in a direction to move the stick away from a neutral position on one input axis, out of values indicated by the counterforce command signal, selectively replaces this value with a value that does not generate a counterforce so as to acquire a corrected counterforce command value, and outputs a corrected counterforce command signal indicating the corrected-counterforce command value, wherein
the counterforce correction processor selectively replaces the corrected-counterforce command value, when at least either the input coordinate value or the velocity command value is a value to stop the load object, with a value that does not generate counterforce, so as to acquire the corrected counterforce command value, and outputs the corrected counterforce command signal.

17. An auxiliary apparatus of a remote handling apparatus for a load object allowing an operator, who manually operates a load lifting device in a remote location using a joystick device, to recognize counterforce via a stick, comprising:
a counterforce generator that is connected to a stick, which accepts manual operation, of the joystick device, and that generates the counterforce according to a value indicated by a received-counterforce command signal; and
a pulsed counterforce controller that calculates a time rate of change of either a deviation amount, which indicates a difference of a dynamic load value from a static load value of the load object, or the dynamic load value, and outputs a counterforce command signal indicating a counterforce command value for generating a pulsed counterforce to the counterforce generator according to the presence of the time rate of change.

18. An auxiliary apparatus of a remote handling apparatus for a load object allowing an operator, who manually operates a load lifting device in a remote location using a joystick device, to recognize counterforce via a stick, comprising:
a counterforce generator that is connected to a stick, which accepts manual operation, of the joystick device, and generates the counterforce according to a value indicated by a received-counterforce command signal; and
a deviation counterforce controller that calculates a deviation amount, which indicates a difference of a dynamic load value from a static load value of the load object, and outputs a counterforce command signal indicating a counterforce command value to the counterforce generator according to the presence of the deviation amount.

19. The auxiliary apparatus of a remote handling apparatus according to claim 17, further comprising:
a counterforce correction processor that determines, based on either an input coordinate value of the stick or a velocity command value corresponding to the input coordinate value, a value that generates a counterforce in a direction to move the stick away from a neutral position, out of values indicated by the counterforce command signal, selectively replaces this value with a value that does not generate the counterforce, so as to acquire a corrected counterforce command value, and outputs a corrected-counterforce command signal indicating the corrected-counterforce command value, wherein
the counterforce generator of the joystick device receives the corrected-counterforce command signal from the counterforce correction processor, instead of the counterforce command signal, and generates a counterforce in a direction to change the input coordinate value of one input axis according to the corrected-counterforce command value, whereby
the counterforce is generated in a direction to move the stick toward the neutral position.

20. The auxiliary apparatus of a remote handling apparatus according to claim 18, further comprising:
a counterforce correction processor that determines, based on either an input coordinate value of the stick or a velocity command value corresponding to the input coordinate value, a value that generates a counterforce in a direction to move the stick away from a neutral position, out of values indicated by the counterforce command signal, selectively replaces this value with a value that does not generate the counterforce, so as to acquire a corrected counterforce command value, and outputs a corrected-counterforce command signal indicating the corrected-counterforce command value, wherein
the counterforce generator of the joystick device receives the corrected-counterforce command signal from the counterforce correction processor, instead of the counterforce command signal, and generates a counterforce in a direction to change the input coordinate value of one input axis according to the corrected-counterforce command value, whereby
the counterforce is generated in a direction to move the stick toward the neutral position.

\* \* \* \* \*